Dec. 9, 1969 J. H. HARSHBARGER 3,483,479

SIGNAL GENERATOR

Filed Oct. 2, 1967 3 Sheets-Sheet 1

INVENTOR
JOHN H. HARSHBARGER

BY Melvin A. Crosby

INVENTOR
JOHN H. HARSHBARGER

BY

INVENTOR
JOHN H. HARSHBARGER

BY
Melvin A. Crosby

United States Patent Office 3,483,479

Patented Dec. 9, 1969

3,483,479

SIGNAL GENERATOR

John H. Harshbarger, Xenia, Ohio, assignor to Visual Information Institute, Inc., Xenia, Ohio, a corporation of Ohio Filed Oct. 2, 1967, Ser. No. 672,058
Int. Cl. H03k 3/26, 3/33
U.S. Cl. 331—52 9 Claims

ABSTRACT OF THE DISCLOSURE

The invention relates to a signal generator in which a slower rate pulse generator controls the on and off periods of a faster rate pulse generator while the generators are isolated from each other when no control is being exercised.

The development of pulse signals of two different rates or frequencies is many times required for testing purposes and for other reasons. In television devices, for example, the relationship of the scanning lines in the raster is dependent on the vertical and horizontal scanning rates and which must be locked in synchronism with each other. Further, any signals that are to be employed for test purposes in a television device must be inserted synchronously with the scanning rates to produce results.

The present invention proposes circuitry to meet the conditions referred to which is simple and thus more reliable than previously known circuitry and which is also free of the limitations of previously known circuitry.

Heretofore, when two signal pulses of different rates or frequencies were developed in a single circuit arrangement, the rate of the faster signal was a multiple of the rate of the slower signal because the slower rate signal was obtained by counting down, or dividing the frequency of the faster rate signal. The circuit of the present invention permits the frequencies of the faster and slower rate signals to bear any desired, or required, relationship to each other while allowing the on and off cycles of the faster rate signal to be controlled as desired.

In further connection with the independence of the slower and faster rate signals, either or both thereof can be referenced to any external source of signal or reference level independently of the other. With previously known arrangements wherein the faster and slower rate pulses are related by counting methods, only one of the different rate pulses can be referenced to an external source.

The present invention, in brief, is practiced by utilizing:

(I) a control gate circuit;
(II) a driving circuit fed by the control gate circuit;
(III) a gating diode under the control of the driving circuit; and
(IV) an astable multivibrator under the control of said gating diode.

The control gate circuit may take the form of a squaring amplifier supplied by an externally developed pulse, a bistable multivibrator operated by externally developed trigger pulses, a binary counter, a free runing astable multivibrator, or any other type of pulse generating circuit.

The control gate circuit can be assembled from any type of electronic components. The requirements imposed upon the control gate circuit and the driving circuit are merely that a slower rate pulse be developed at an impedance and voltage level which will provide the control signal for the faster rate pulse generator and with the control signal from the slower rate pulse generator having a rise time at least no greater than the one-half cycle of the faster rate pulse to be controlled.

The nature of the present invention will be more clearly understood upon reference to the following detailed specification taken together with the accompanying drawings, in which.

Figure 2:
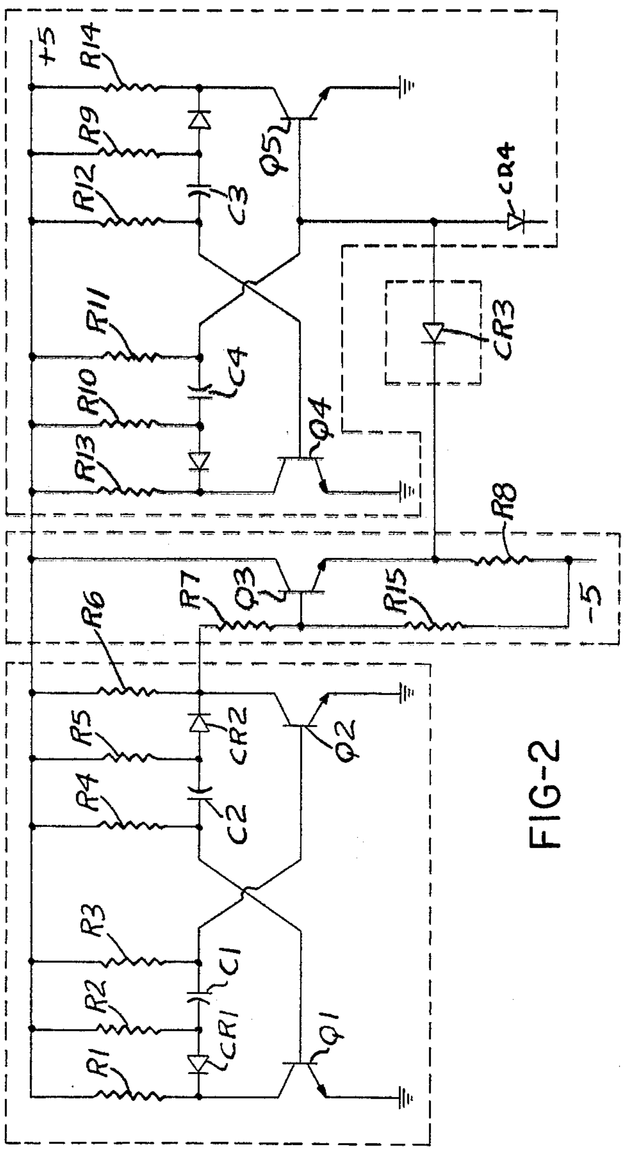
FIGURE 2 is a schematic view showing one form which the circuit can take.
Figure 3:
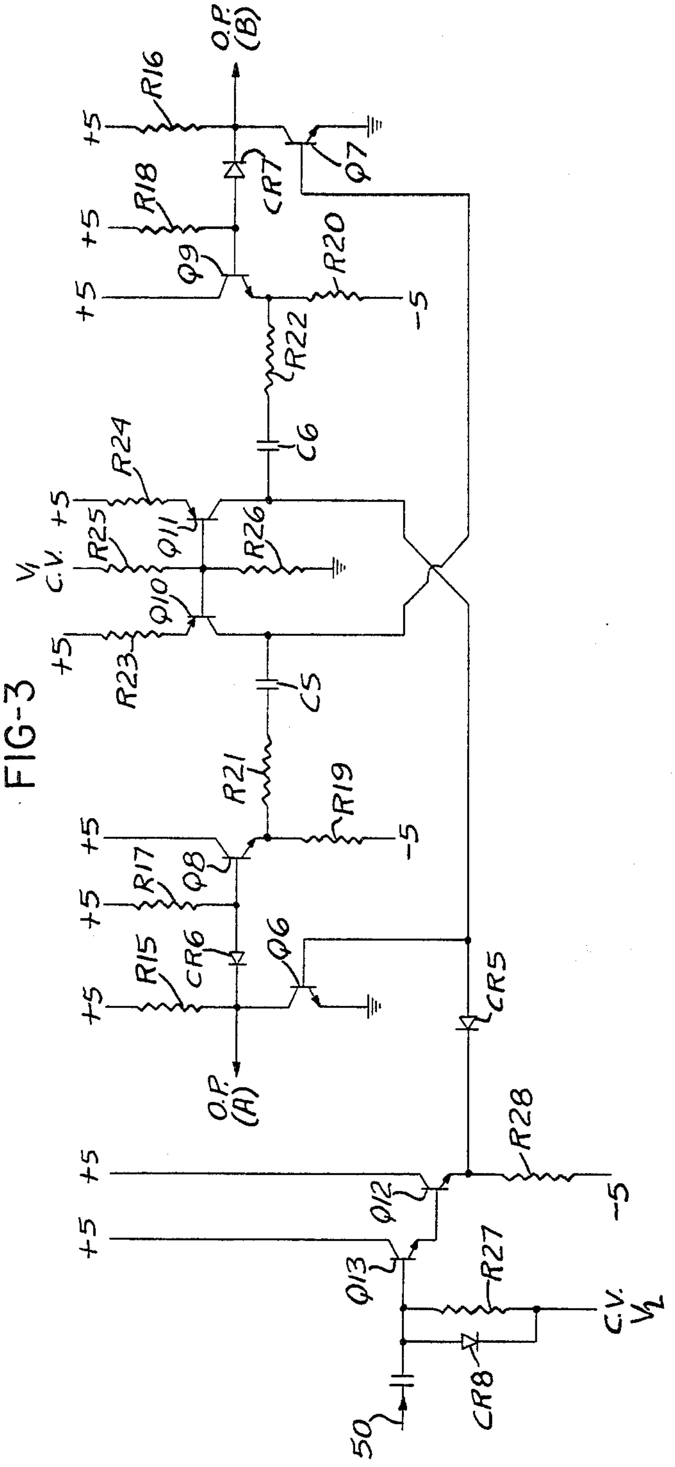
FIGURE 3 shows a circuit similar to that of FIGURE 2 but containing certain refinements.

It has been mentioned that the control gate circuit could take many forms and, for the sake of convenience, it is shown in FIGURE 2 as an astable multivibrator. In FIGURE 3, a similar astable multivibrator could form the control gate circuit, or any other circuit developing a suitable pulse could be employed.

Figures 1, 4:
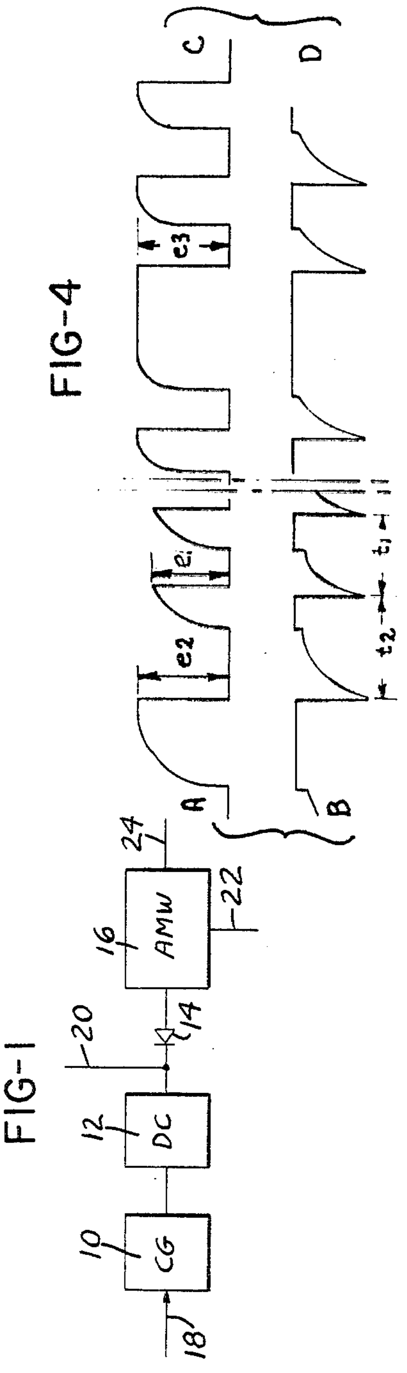
FIGURE 1 is a schematic block diagram of a circuit according to the present invention.
FIGURE 4 shows how the circuit of FIGURE 3 provides for a uniform voltage level and waveform at a critical point in the circuit.

In FIGURE 1, 10 represents the control gate circuit which develops a pulse that is transmitted via driving circuit 12 to gating diode 14. The signal from gating diode 14 is delivered in controlling relation to astable multivibrator 16.

Circuit 10 may itself be in the form of a free running astable multivibrator like circuit 16 but proportioned to run at a slower rate, or it may take the form of other type circuitry requiring triggering or controlling signal pulses via input 18. Such signal pulses may be derived from any desired control source.

Further, the pulses supplied to the gating diode 14 from the driver circuit 12, may be availed of via a connection 20 for use as may be desired. The pulses so supplied to the gating diode are generated, amplified, shaped, or shaped and amplified in the control gate circuit to provide for the sharp rise control pulse required to control circuit 16.

Circuit 16 may have an optional synchronizing, gating, or AFC control connection at 22 and delivers its output at a connection 24.

It will be appreciated that no master faster rate oscillator is required together with counting or frequency dividing circuitry to obtain the lower rate pulses. The circuitry of the present invention is thus more simple than has heretofore been available, is more reliable due to the greater simplicity thereof, and is more flexible because of the independence of the faster and slower pulse rate generators from each other.

Referring to FIGURE 2, the control gate circuit having the lower rate pulses is shown as an astable multivibrator consisting of transistors Q1 and Q2 having grounded emitters, resistors R1 to R6, all connected at one end to a supply of positive voltage, plus 5 volts for example, diodes CR1 and CR2 and capacitors C1 and C2. The end of resistor R1 opposite the positive voltage line is connected to the collector of transistor Q1, while resistor R6 is similarly connected to transistor Q2. Resistors R3 and R4 are connected to the bases of transistors Q2 and Q1 respectively. Resistor R2 is connected to the collector of transistor Q1 via diode CR1 and with the base of transistor Q2 via capacitor C1. Similarly, resistor R5 is connected to the collector of transistor Q2 via diode CR2 and with the base of transistor Q1 via capacitor C2.

Resistors R3 and R4 generally determine the cycling speed of the multivibrator, diodes CR1 and CR2 are speed up diodes, and resistors R2 and R5 give a rapid rise time. With load resistors of 1000 ohms at R1 and R6, and with R2 and R3 also equal to 1000 ohms and with R3 and R4 equal to about 4700 ohms and capacitors C1 and C2 equal to 10,000 picofarads, the multivibrator will develop an output pulse of about 5 volts across the load resistors with pulse periods of about 100 microseconds each and with a pulse rise time of about 0.1 microsecond or better.

The driving circuit comprises transistor Q3 having its collector connected to the positive voltage line and its emitter connected via the 1100 ohm resistor R8 with a source of reference voltage at −5 volts. The base of transistor Q3 is connected via resistor R7 with the collector of transistor Q2 and via resistor R15 with −5 volt reference voltage source.

When transistor Q2 is conductive, the base of transistor Q3 is referred to saturation voltage of Q1 and its emitter goes to slightly below ground due to the 0.7 volt base-to-emitter voltage drop in Q3.

When transistor Q2 is not conducting, the base of transistor Q3 is receiving bias current at about 4 volts plus and Q3 goes conductive. When Q3 is conductive, its emitter goes to about +3.3 volts. The swing of the emitter of Q3 between approximately ground and about +3.3 volts develops the control pulse for the faster rate pulse generator.

The faster rate pulse generator will be seen to be an astable multivibrator similar to the slower rate pulse generator except that resistors R11 and R12, corresponding to resistors R3 and R4, are 4700 ohms each, while capacitors C3 and C4, corresponding to capacitors C1 and C2 are 1000 picofarads. These values produce the faster rate of cycling of the astable multivibrator to produce the faster rate pulses. Resistors R13, R10, R9 and R14, corresponding to and are the same size as resistors R1, R2, R5 and R6, respectively.

The drive circuit interlocks the control gate pulse generator with the faster rate pulse generator via the diode CR3 connected between the base of transistor Q5 of the faster rate generator and the emitter of transistor Q3 and poled toward the latter so that Q5 is sensitive to negative voltage only at the emitter of Q3.

The faster rate generator includes a second transistor Q4. The resistors, capacitors, diodes, and transistors of the faster rate generator are interconnected in the same manner as described for the slower rate generator.

Signals can be taken from the collector of either of transistors Q4 and Q5 for any desired purpose. An emitter follower can be used to advantage to develop signals because such a configuration will not load the astable multivibrator circuit.

In operation, whenever Q3 of the driver circuit is at reduced conduction, Q5 of the astable multivibrator is clamped in nonconductive condition by the −5 reference voltage via resistor R8 and diode CR3.

While Q5 is nonconductive, Q4 is, of course, in a condition of full conduction and will remain in this condition as long as Q5 is so clamped.

When Q3 becomes more conductive, which occurs when Q2 of the slower rate pulse generator is nonconductive and the base of Q3 goes positive, the emitter of Q3 goes positive and the base of Q5 is unclamped from the negative reference voltage source. The diode CR3 now effectively isolates the control gate from the astable multivibrator.

With the base of Q5 unclamped, capacitor C4 will change via resistor R11 and Q5 will enter a stage of conduction which will drive Q4 to nonconduction. Normal cycling of the astable multivibrator will now continue until the next control gate occurs to drive Q5 to nonconduction and clamps it for the duration of the gate.

It will be appreciated that a certain time constant appears because of resistor R11 and capacitor C4 so that the signal from the astable multivibrator signifying the end of the control gate will be delayed from the instant of unclamping of Q5 a predetermined amount.

It will further be appreciated that a control voltage could be inserted into the astable multivibrator via another diode CR4 for control independently of the control gate.

FIGURE 3 shows an astable multivibrator for the higher rate pulses which contains certain refinements over the basic circuit of FIGURE 2. In FIGURE 3 the driver circuit is also shown.

The astable multivibrator of FIGURE 3 comprises resistors R15, R16, R17, R18, R23 and R24 all connected at one end to a plus 5 volt line. R15, 1000 ohms at its other end is connected to the collector of transistor Q6 and also to output line O.P.(A). The emitter of Q6 is grounded. Diode CR6 is connected between the end of 1000 ohm resistor R17 opposite the +5 volt line and the collector of Q6 and is poled toward the latter. The said end of resistor R17 is also connected to the base of transistor Q8, the emitter of which is connected via the 1000 ohm resistor R19 to a −5 volt source and via a 150 ohm resistor R21 with one side of a 1000 picofarad capacitor C5.

The other side of C5 is connected to the base of transistor Q7, the emitter of which is grounded while the collector thereof is connected to the output line O.P.(B) and via the 1000 ohm resistor R16 with the +5 volt line. Diode CR7, poled toward the collector of Q7, connects the collector with the +5 volt line via the 1000 ohm resistor R18 and also with the base of transistor Q8.

The collector of Q8 is connected to the +5 volt line while the emitter thereof is connected via the 1000 ohm resistor R20 with a −5 volt source and via a 150 ohm resistor R22 with one side of a 1000 picofarad capacitor C6.

The other side of C6 is connected to the base of a transistor Q6.

The emitter of transistors Q10 and Q11 are connected to the +5 volt line via respective 4700 ohm resistors R23 and R24. The bases of Q10 and Q11 are interconnected and are further connected to ground via the 4700 ohm resistor R26 and to a source of plus control voltage, marked C.V., via the 4700 ohm resistor R25.

In FIGURE 3, input line 50 supplies pulses via capacitor 53 to the base of a transistor Q13 which has its collector connected to the +5 v. source and its emitter connected to the base of the emitter follower transistor Q12. Q12 has its collector connected to the +5 v. source and its emitter connected via the 1000 ohm resistor R28 to the −5 v. source.

Diode CR8 and resistor R27 are connected in parallel between the base of transistor Q13 and a source of control voltage V2.

Basically the circuit of FIGURE 3 operates as follows: When Q7 conducts, Q9 is less conductive and the negative volt source via resistors R20, R22 and capacitor C6 makes Q6 nonconductive. When capacitor C6 charges from the +5 volt line via resistor R24 and Q11 sufficient to make Q6 conductive, Q8 goes less conductive and the negative bias applied from the −5 volt source via resistors R19 and R21 and capacitor C5 to the base of Q7 will make it nonconductive.

Q6 can be made nonconductive by a negative signal supplied to the base thereof via diode CR5 which is connected between the base of Q6 and the emitter of transistor Q12 of the driver circuit and poled toward the latter. Transistor Q12 is in the form of an emitter follower for transistor Q13 and has its base connected to the emitter of Q13. The collector of Q12 is connected to the +5 volt line and its emitter, in addition to being connected to diode CR5, is connected to a —5 volt source via the 1000 ohm resistor R28.

It will be appreciated that transistors Q10 and Q11 in FIGURE 3 control the rate at which condensers C5 and C6 charge and thus provide means for precisely controlling the timing of the multivibrator and to obtain greater control range.

The voltage supplied to R25 is normally about 3 volts and transistors Q10 and Q11 and their respective resistors R23 and R24 thus provide constant current circuits for linear charging of condensers C5 and C6. This provides for a straight line charging waveform instead of an exponential waveform to the bases of transistors Q6 and Q7. Thereby a more precise turn-on-time is derived at the bases of Q6 and Q7.

Transistors Q10 and Q11 thus provide a stable source of current for resistors R23 and R24 and a wide range of adjustment of the current is possible.

The combination of transistors Q12 and Q13 in the driving circuit is of merit. Diode CR5, as mentioned, controls transistor Q6 so as to force the multivibrator to an "off" condition when desired.

Transistor Q12 represents nearly zero source impedance and thus clamps the base of Q6 to a certain level whenever the wave form at the emitter of Q12 falls below the level of the base voltage of Q6 via the diode CR5. In this manner, a reference level is established from which Q6 will begin to cycle at the end of a hold-off period. A precise and predictable phase relationship for the pulse train at O.P.(A) is thus had at the end of any hold-off period.

Figure 6:
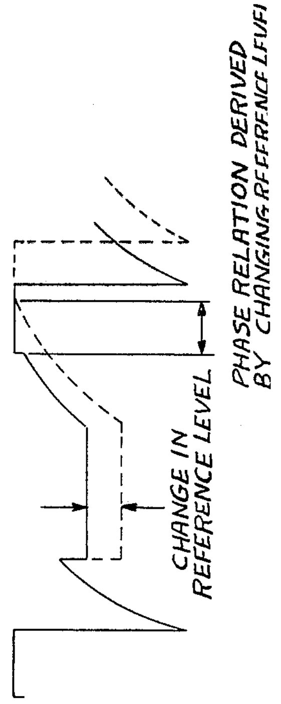
FIGURE 6 shows how the phase relationship of the faster rate pulse can be changed by changing the level of a reference voltage.
Figure 5:
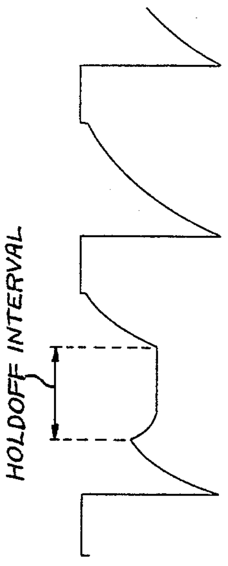
FIGURE 5 shows the output from the faster rate pulse generator and includes an off period.

As will be seen in FIGURE 6, a phase relation control can be effected by a change in the voltage at V2 in FIGURE 3. FIGURE 6 shows the waveform at the base of Q6 with the full line showing the waveform at one voltage at V2 and the dotted line showing the waveform at another voltage at V2. The legends show the shift in phase that results. The disclosed combination of transistors Q12 and Q13 make it easy to effect this control.

Figure 7:
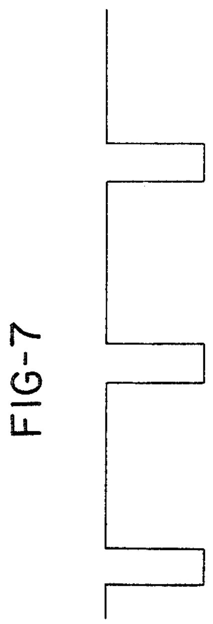
FIGURE 7 shows the control waveform for the driver circuit of FIGURE 3.

With further reference to the driving circuit, FIGURE 7 shows the pulses supplied via wire 50 to capacitor 53. These pulses are negative going and amount to about 20% of the time. The level of the input pulses will tend to vary if the duty cycle varies but diode CR8 will prevent such change. The reference voltage at V2 thus controls the level at which the input pulses are presented to the base of Q13 and, therefore, to the emitter of Q12. Q13 and Q12 form a high impedance circuit which minimizes the loading of capacitor 53 and R27 which establish the reference voltage level.

The voltage at the emitter of Q12 will be a pulse which has one level below the voltage at which Q6 will conduct and at this time CR5 conducts and clamps the base of Q6 and the one side of C6 to a certain clamping reference voltage. When the emitter of Q12 goes to its higher voltage, CR5 ceases to conduct and capacitor C6 commences to charge up until sufficient voltage is developed thereon to make Q6 conductive. The level of the pulses at the emitter of Q12 relative to the voltage at the base of Q6 which will conduct Q6 conduct determines the length of time for the vibrator to commence to operate when C6 is unclamped from the reference voltage at the emitter of Q12.

Figure 8:
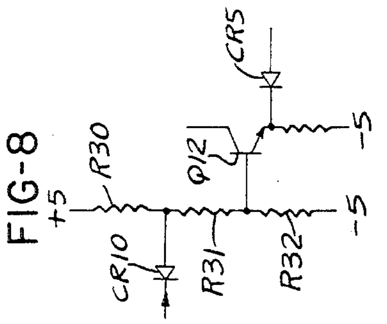
FIGURE 8 shows a modification of the driver circuit.

FIGURE 8 shows how the input circuit could appear if no phase shift at Q6 was desired. In FIGURE 8, the input pulses are supplied via diode CR10 to the voltage divider consisting of resistors R30, R31, and R32. The resistors provide for a constant D.C. bias for reference to diode CR5.

Figure 9:
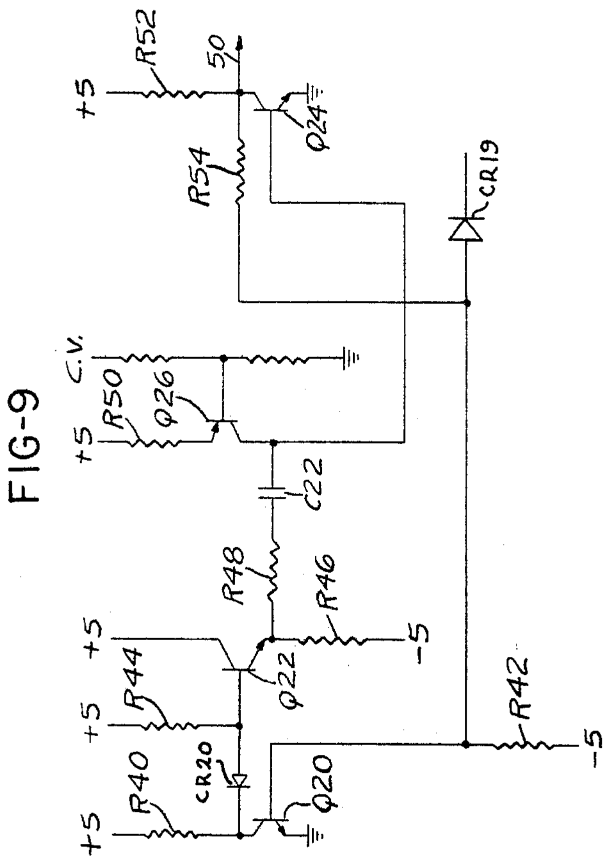
FIGURE 9 shows circuit employing a monostable vibrator.

FIGURE 9 shows a circuit wherein the multivibrator is monostable.

In FIGURE 9, the trigger pulse is supplied from the drive circuit via diode CR19 to the base of Q20, which has its emitter grounded and its collector connected via resistor R40 to the plus 5 volt line. The base of Q20 is also connected to —5 volts via resistor R42. Diode CR20, poled toward the collector of Q20, connects the collector of Q20 to the base of Q22 and via resistor R44 with +5 volts.

The collector of Q22 is connected to +5 volts and the emitter is connected to —5 volts via resistor R46 and via resistor R48 to one side of capacitor C22.

The other side of capacitor C22 is connected to the base of Q24 and also to the collector of Q26, the emitter of which is connected via resistor R50 to +5 v.

The base of Q26 is connected to the midpoint of a voltage divider leading from a source of control voltage to ground.

The collector of Q24 is connected to +5 v. via resistor R52 and with the base of Q20 via resistor R54. The emitter of Q24 is grounded. Signals are taken from the collector of Q24 via line 51.

Q26, as explained in connection with capacitors C5 and C6 of FIGURE 3, enables the charging of C22 to be controlled with great precision even with wide variation in input trigger timing. The circuit is, of course, operative without Q26 but the same fine control is not possible.

Reference to FIGURE 4 will show the merit of Q8 in the circuit of FIGURE 3, described above, and will, in general, represent the merit of controlled charging of the capacitor C5 in any similar multivibrator circuit.

In the curve marked A there is shown the waveform at the side of C5 which is connected to the base of Q7. It will be noted that during turn-off, the voltage on C5 rises to an abnormally high level. Curve B shows what this does at the base of Q7. It will be seen that the first rise at the base of Q7 after turn-off is longer than subsequent rises so that the interval marked $t2$ is greater than the subsequent intervals marked $t1$. This is due, of course, to the fact that $e2(A)$, after turn-on, is greater than the normal $e1(A)$.

When Q8 is employed, capacitor C5 can charge to full value in a much shorter time so that in all normal operations, there will be no variation as shown in curves A and B of FIGURE 4. Curves C and D show the conditions which prevail when Q8 is in the circuit. It will be noted that the capacitor charges to full value each time.

In FIGURE 3, Q9 performs the same function for Q6 but this side of the vibrator circuit is less critical.

In FIGURE 9, Q22 performs the described function for Q24.

When the circuit is used in an instrument such as for developing a precise bar-dot pattern for use in CCTV systems, the described control of the charging rate of the capacitor is extremely important.

Any of general types of alternator could be used to supply the lower rate pulses. Further, the higher rate generator can be run as a separate entity if so desired and can be controlled from a separate signal source.

It is possible, of course, to vary the generator frequencies by varying the control voltages. The lower rate control pulse width, however, must be equal to about ⅓ of the complete cycle time of the faster rate generator to prevent a missed cycle at the control gate due to the voltage at the emitter of the control driving circuit being positive to the exponential charge at the base of the controlled transistor.

The circuit arrangement illustrated can be used for generating display signals for radar and computer developed displays and for synthesizing signals for bandwidth and signal quality checking of line amplifiers and other devices.

As an example of the capabilities of the circuit, the higher rate generator has been run at 20 megacycles with a 15,750 kilocycle control pulse of 5 microseconds width.

It will be understood that this invention is susceptible to modification in order to adapt it to different usages and conditions and, accordingly, it is desired to comprehend such modifications within this inventon as may fall within the scope of the appended claims.

What is claimed is:

1. In an electronic circuit; a vibrator having a component with a voltage sensitive control element, said vibrator operating when said control element is at a first voltage which is equal to or on one side of a predetermined voltage and being prevented from operating when said control element is at a second voltage on the other side of said predetermined voltage, a capacitor having one side connected to said control element, a source of charging voltage connected to said one side of said capacitor for charging said capacitor to said predetermined voltage, a source of pulses having a first voltage level on said one side of said predetermined voltage and a second voltage level on said other side of said predetermined voltage, said second voltage level forming a clamping reference voltage, and a gating diode connecting said source of pulses to said control element and conductive only when said pulses are at said second voltage level whereby a supply of said pulses alternately clamps said control element to said clamping reference voltage and releases said control element therefrom, the difference between said camping reference voltage and said predetermined voltage determining the time required for said capacitor to charge up to said predetermined voltage and cause the vibrator to commence operating when said gating diode ceases to conduct due to said pulses going from said second voltage to said first voltage.

2. An electronic circuit according to claim 1 in which said source of pulses comprises a driving circuit having an output terminal connected to said control element and also having an input terminal, and a control gate having an output terminal connected to the input terminal of said driving circuit and supplying a substantially rectangular control pulse thereto, said control pulses having a rise time such that the pulses at the output terminal of said driving circuit have a rise time no greater than one-half cycle of the pulse rate of said vibrator.

3. An electronic circuit according to claim 2 in which said vibrator is a free running astable multivibrator comprising first and second components which conduct alternately, and each of which has a voltage sensitive control element, said first component comprising the component having its control element connected to said gating diode, a second capacitor having one side connected to the control element of said second component, and a further source of charging voltage connected to said one side of said second capacitor, both of said sources of charging voltage comprising constant current sources.

4. An electronic circuit according to claim 3 in which each said constant current source comprises a transistor having its collector-emitter path in the charging circuit of the pertaining capacitor, and a source of constant bias voltage connected to the bases of said transistors.

5. An electronic circuit according to claim 4 which includes resistance means connecting the other side of each said capacitor with a first source of constant voltage at a potential on said other side of said predetermined voltage, a second source of constant voltage at a potential on said one side of said predetermined voltage, a respective switching means connecting an intermediate point along each said resistance means to said second source of constant voltage, and each said component being connected in controlling relation to the said switching means connected to the resistance means for the capacitor pertaining to the other of said components in such a manner that each switching means conducts when its controlling component is nonconductive and vice versa.

6. An electronic circuit according to claim 5 in which each said switching means is a transistor having its collector-emitter path serially connected between said intermediate point along the respective resistance means and said second source of constant voltage, a said source of forward biasing potential for each transistor connected to the base thereof, a circuit branch in which each said component is disposed and having a second point thereon which is at said forward biasing potential when the respective component is nonconductive and which goes toward reverse biasing potential when the respective component is conductive, and a diode connecting the base of each said transistor with the respective said second point of the branch circuit of its controlling component and conveying said reverse biasing potential to the base of the respective transistor when the respective said component is conductive.

7. An electronic circuit according to claim 5 in which said driving circuit comprises a high impedance source in the form of a resistor connecting said first source of constant voltage with said second source of constant voltage and a drive transistor having its collector-emitter path interposed between said resistor and said second source of constant voltage, the end of said resistor adjacent said collector-emitter path of said drive transistor forming the said output terminal for said driving circuit, means for supplying pulses from said control gate to the base of said drive transistor to vary the conductivity thereof, and means for supplying a variable forward bias voltage to the base of said drive transistor to control the impedance of the combination of the resistor and the transistor and thereby control the level of said clamping reference voltage.

8. An electronic circuit according to claim 7 in which said means for supplying pulses from said control gate to said drive transistor comprises a second drive transistor having its collector-emitter path connected between said second source of constant voltage and the base of the first mentioned drive transistor, a capacitor connecting the output terminal of said control gate to the base of said second drive transistor, and a resistor connecting a source of said variable bias voltage to the base of said second drive transistor.

9. An electronic circuit according to claim 8 which includes a diode connected in parallel with said last mentioned resistor.

References Cited

UNITED STATES PATENTS

| | | | |
|---|---|---|---|
| 2,392,114 | 1/1946 | Bartelink | 331—145 |
| 3,037,114 | 5/1962 | Bier et al. | 331—145 |
| 3,239,779 | 3/1966 | Rywak | 331—113 |

OTHER REFERENCES

Sprott: IBM Tech. Disc. Bul., vol. 5, No. 7, December 1962, p. 93.

Electronic Engineering, pp. 794–795, December 1965.

Bell et al.: Proc. IEE, vol. 114, No. 3, March 1967, pp. 327–332.

JOHN KOMINSKI, Primary Examiner

U.S. Cl. X.R.

307—273, 291, 292; 331—47, 51, 113